US007798029B2

(12) United States Patent
Kim

(10) Patent No.: US 7,798,029 B2
(45) Date of Patent: Sep. 21, 2010

(54) VIBRATION APPARATUS FOR GENERATING SPHEROID WAVELENGTH

(76) Inventor: Doo Sang Kim, 4-904 Asia Seonsuchon Apt. 86 Jamsil-dong, Songpa-gu, Seoul, 138-220 (KR)

( * ) Notice: Subject to any disclaimer, the term of this patent is extended or adjusted under 35 U.S.C. 154(b) by 544 days.

(21) Appl. No.: 11/674,682

(22) Filed: Feb. 14, 2007

(65) Prior Publication Data

US 2007/0193403 A1 Aug. 23, 2007

(30) Foreign Application Priority Data

Feb. 20, 2006 (KR) ...................... 10-2006-0016259
Jan. 18, 2007 (KR) ...................... 10-2007-0005673

(51) Int. Cl.
*F16H 33/10* (2006.01)

(52) U.S. Cl. ........................................................ 74/87

(58) Field of Classification Search ..................... 74/25, 74/61, 87; 198/770, 750.8, 763; 310/81; 366/128; 601/65, 67-73, 112; 172/40; 404/113, 404/117; *H02K 7/65, 7/75*
See application file for complete search history.

(56) References Cited

U.S. PATENT DOCUMENTS 1,779,923 A * 10/1930 Wagner ......................... 74/61
2,059,754 A * 11/1936 Shaler ........................... 74/61
3,238,799 A * 3/1966 Baker ............................ 74/87
4,270,396 A * 6/1981 Fallows ......................... 74/87
4,580,456 A * 4/1986 Takano .......................... 74/87
4,940,336 A * 7/1990 Dryga et al. ................ 366/128
5,134,893 A * 8/1992 Hukki et al. ................... 74/61
5,798,588 A * 8/1998 Okuyama et al. ............. 310/81
5,801,466 A * 9/1998 Odagiri et al. ................ 310/81
6,081,055 A * 6/2000 Narusawa .................... 310/81
2005/0076729 A1* 4/2005 Hsieh ............................ 74/25
2006/0082231 A1* 4/2006 Kayama et al. ............... 310/81

FOREIGN PATENT DOCUMENTS

GB 2378048 A * 1/2003
JP 60026431 A * 2/1985
JP 03070447 A * 3/1991

* cited by examiner

*Primary Examiner*—Thomas R Hannon
*Assistant Examiner*—Phillip Johnson
(74) *Attorney, Agent, or Firm*—Harness, Dickey & Pierce, PLC

(57) ABSTRACT

Disclosed is a vibration apparatus for generating a spheroid wavelength by eccentrically rotating a rotation shaft using an eccentric weight. The vibration apparatus includes: an electric motor for generating rotation force; a bracket coupled to a coupling member on the upper portion of the electric motor and having a thru-hole formed at the center portion of the bracket, through which the rotation shaft of the electric motor extends; a cylindrical support member coupled to the edge of the bracket at a lower surface of the cylindrical support member; an eccentric weight coupled to the rotation shaft extending through the bracket and eccentrically rotating on the bracket so that the rotation movement of the rotation shaft is converted into three-dimensional movement generating the spheroid wavelength; and a vibration plate coupled to the upper portion of the cylindrical support member and receiving through the rotation shaft the three-dimensional movement caused by the eccentric rotation of the eccentric weight, for generating the spheroid wavelength. The vibration apparatus can restrain the shaking of the vibration apparatus caused by the three-dimensional movement due to the eccentric rotation of the eccentric weight, and maintain the stability of the rotation shaft so that a vibration plate generates the spheroid wavelength effectively when the eccentric weight rotates.

2 Claims, 8 Drawing Sheets

A

B

VIBRATION APPARATUS FOR GENERATING SPHEROID WAVELENGTH

BACKGROUND OF THE INVENTION

1. Field of the Invention

The present invention relates to a vibration apparatus for generating a spheroid wavelength, and more particularly to a vibration apparatus for generating three-dimensional spheroid wavelength, in which the rotation shaft of an electric motor is eccentrically rotated by means of an eccentric weight.

2. Description of the Prior Art

Generally, as city life is popularized, various indoor exercise equipments such as a running machine, a vibration belt, etc. are used for obtaining a maximum workout within a short period of time without the restriction of location due to an exercise space or time. Such exercise equipments benefit the human body according to the type of exercise.

Meanwhile, an apparatus has been recently spotlighted in which a vibration plate for generating vibration using a vibrator alternately moves leftward and rightward, or vertically moves upward and downward to relax or massage rigid muscles, so as to obtain aerobic training effect and to help blood circulation and skeletal correction.

However, a conventional vibration apparatus has currently generated vibration (A) to the extent of shaking and vibration (B) to the extent of backslapping in FIG. 1A.

SUMMARY OF THE INVENTION

Accordingly, the present invention has been made to solve the above-mentioned problems occurring in the prior art, and it is an object of the present invention to provide a vibration apparatus for generating a spheroid wavelength (a three-dimensional wavelength), which can be applied to various apparatuses contributing to the improvement of human health using the spheroid wavelength.

In order to achieve the above object of the present invention, there is provided a vibration apparatus for generating a spheroid wavelength, which includes: an electric motor for generating rotation force; a bracket coupled to a coupling member on the upper portion of the electric motor and having a thru-hole formed at the center portion of the bracket, through which the rotation shaft of the electric motor extends; a cylindrical support member coupled to the edge of the bracket at a lower surface of the cylindrical support member; an eccentric weight coupled to the rotation shaft extending through the bracket and eccentrically rotating on the bracket so that the rotation movement of the rotation shaft is converted into three-dimensional movement generating the spheroid wavelength; and a vibration plate coupled to the upper portion of the cylindrical support member and receiving through the rotation shaft the three-dimensional movement caused by the eccentric rotation of the eccentric weight, for generating the spheroid wavelength.

Preferably, the eccentric weight has a shape of a semi-circular plate, and has a thru-hole formed at the center portion of the eccentric weight in order to couple a hinge to the rotation shaft.

Further, the eccentric weight has an inclined surface portion formed in a manner of cutting the upper surface of the eccentric weight from an end portion of a semi-circular surface to a portion at which the thru-hole is formed.

In order to achieve the object of the present invention, there is provided a vibration apparatus for generating a spheroid wavelength, which includes: an electric driving motor for generating rotation force; an eccentric weight coupled to the rotation shaft of the electric driving motor and eccentrically rotating so that the rotation movement of the rotation shaft is converted into three-dimensional movement causing the generation of the spheroid wavelength; and a cover coupled to the upper portion of the eccentric weight for restraining the shaking of the upper portion of the eccentric weight caused by the three-dimensional movement due to the eccentric rotation of the eccentric weight.

Preferably, the electric driving motor includes an electric motor, a lower case for enclosing the lower peripheral surface of the electric motor, an upper case for enclosing the upper peripheral surface of the electric motor, and connection means for connecting both cases.

Further, a plurality of screw holes is formed at an equal interval along the edge of the lower case.

In addition, a plurality of screw holes is formed at an equal interval along the edge of the inner surface of the upper case, and the upper case has thru-holes formed at the center portion and both sides of the upper case.

Furthermore, the eccentric weight has an inclined surface portion formed in a manner of cutting the upper surface of the eccentric weight from an end portion of a semi-circular surface to a portion at which the thru-hole is formed.

Additionally, the cover includes an upper cover, a lower cover extending from the lower surface of the upper cover, and a bearing installed in and extending through the upper and lower covers.

Further, the lower cover has screw holes formed at the center portion of both sides of the lower cover.

BRIEF DESCRIPTION OF THE DRAWINGS

The above objects, other features and advantages of the present invention will become more apparent after a reading of the following detailed description when taken in conjunction with the drawings, in which.

DETAILED DESCRIPTION OF THE PREFERRED EMBODIMENTS

Hereinafter, the preferred embodiments of the present invention will be described with reference to the accompanying drawings.

A spheroid wavelength according to embodiments of the present invention is a three-dimensional spheroid wavelength caused by the eccentric rotation of a rotation shaft which is eccentric from the central axis of an electric motor.

Such a spheroid wavelength has a remarkable permeability to the human body. Therefore, if the spheroid wavelength is applied to a medical field, it functions as a stimulant having an effect on vascular occlusion or muscle pain.

Figure 2:
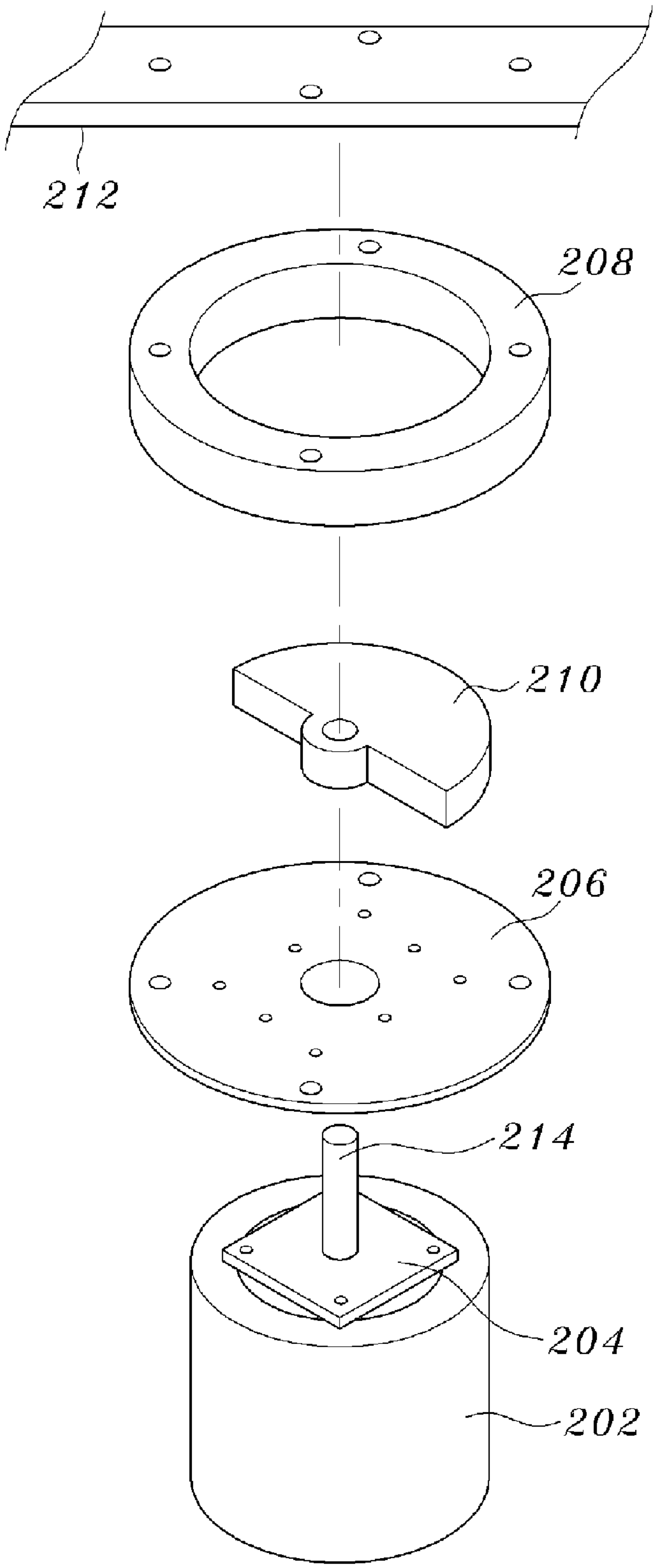
FIG. 2 is an exploded perspective view showing a vibration apparatus for generating a spheroid wavelength according to an embodiment of the present invention.
Figure 3:
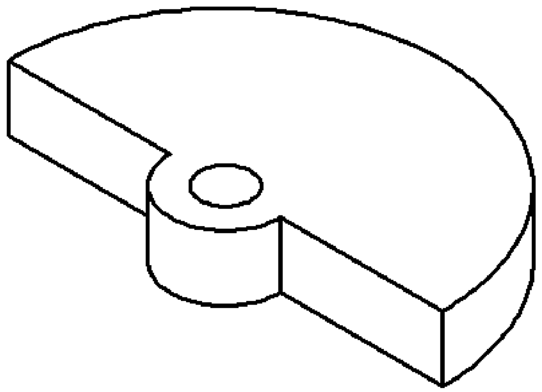
FIG. 3 is a view showing a configuration of an eccentric weight employed in the vibration apparatus of FIG. 2.
Figure 3:
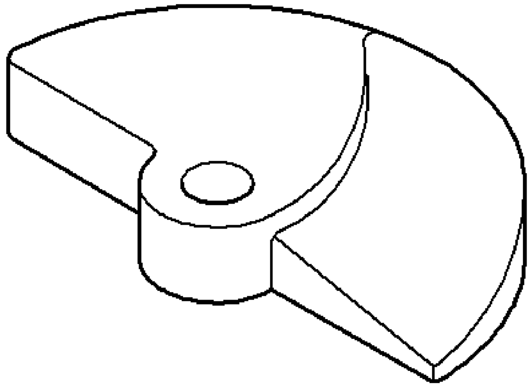
Figure 4:
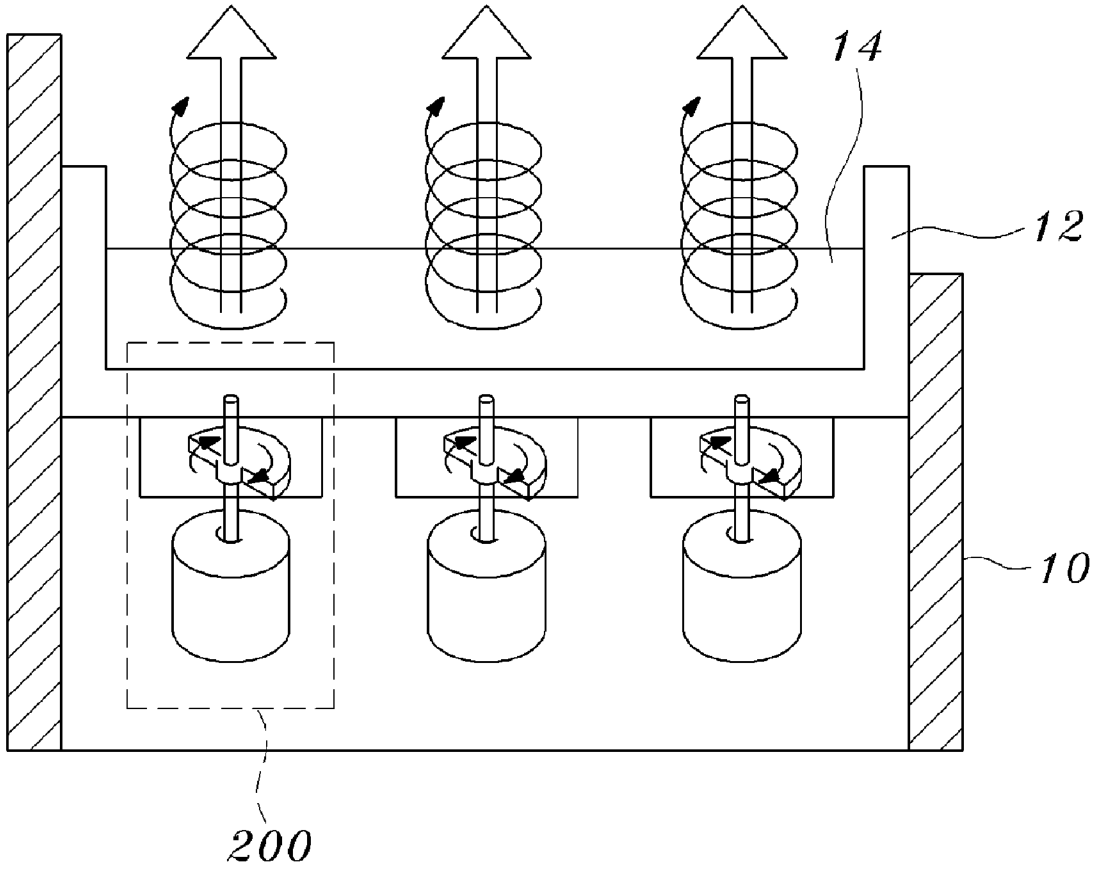
FIG. 4 is a view illustrating the application of the vibration apparatus for generating the spheroid wavelength according to the embodiment of the present invention.

Specifically, the present invention relates to the vibration apparatus for generating such a spheroid wavelength more effectively. FIG. 2 is an exploded perspective view of the vibration apparatus for generating the spheroid wavelength according to the embodiment of the present invention. FIG. 3 is a view showing the configuration of the eccentric weight employed in the vibration apparatus of FIG. 2. FIG. 4 is a view illustrating an application of the vibration apparatus for generating the spheroid wavelength according to the present invention.

Referring to FIGS. 2 and 3, the vibration apparatus for generating the spheroid wavelength according to the present invention includes an electric motor, a bracket coupled with a coupling member disposed on the upper portion of the electric motor, a cylindrical support member coupled to an edge of the bracket at a lower surface thereof, an eccentric weight coupled to a rotation shaft extending through the bracket and eccentrically rotating on an upper surface of the bracket, and a vibration plate receiving a three-dimensional vibrating movement generated by the eccentric rotation of the eccentric weight trough the rotation shaft, so as to generate the spheroid wavelength.

Reference numerals 204 and 214 which are not described above denote a coupling member for coupling the bracket 206 to the electric motor 202, and the rotation shaft for transmitting rotation force generated by the electric motor 202 to the eccentric weight 210, respectively.

The electric motor 202 receives electricity from an external electric source or an internal battery so as to rotate the rotation shaft 214.

The rotation shaft 214 has the coupling member 204 mounted on the upper portion thereof in order to assemble the bracket 206 with the electric motor 202. Thus, the electric motor 202 can be attached to the lower surface of the bracket 206.

Further, the bracket 206 has a thru-hole formed at the center portion thereof, through which the rotation shaft 214 extends. The cylindrical support member 208 is attached to the edge of the bracket 206 so as to support the bracket 206 and the vibration plate 212.

The eccentric weight 210 has a shape of a semi-circular metal plate, and a thru-hole formed at the center portion thereof so as to be coupled with the rotation shaft 214 (see FIG. 3A).

Preferably, the eccentric weight 210 has an incline surface portion 210*a* formed to be inclined in a manner of spirally cutting the upper surface of the eccentric weight 210 from a corner of the semi-circular shaped weight 210 to the intermediate portion, as shown in FIG. 3B. As a result, it is possible to reduce noise due to the rotation of the eccentric weight 210 effectively.

Specifically, the rotation shaft 214 rotates clockwise according to the operation of the electric motor 202 and the eccentric weight 210 rotates along with the rotation shaft 214. As a result, air friction may cause noise to generate in the vibration apparatus 200 according to the present invention. However, the incline surface portion 210*a* is formed at the right corner in order to reduce direct air resistance, thereby solving a noise problem effectively.

Figure 5:
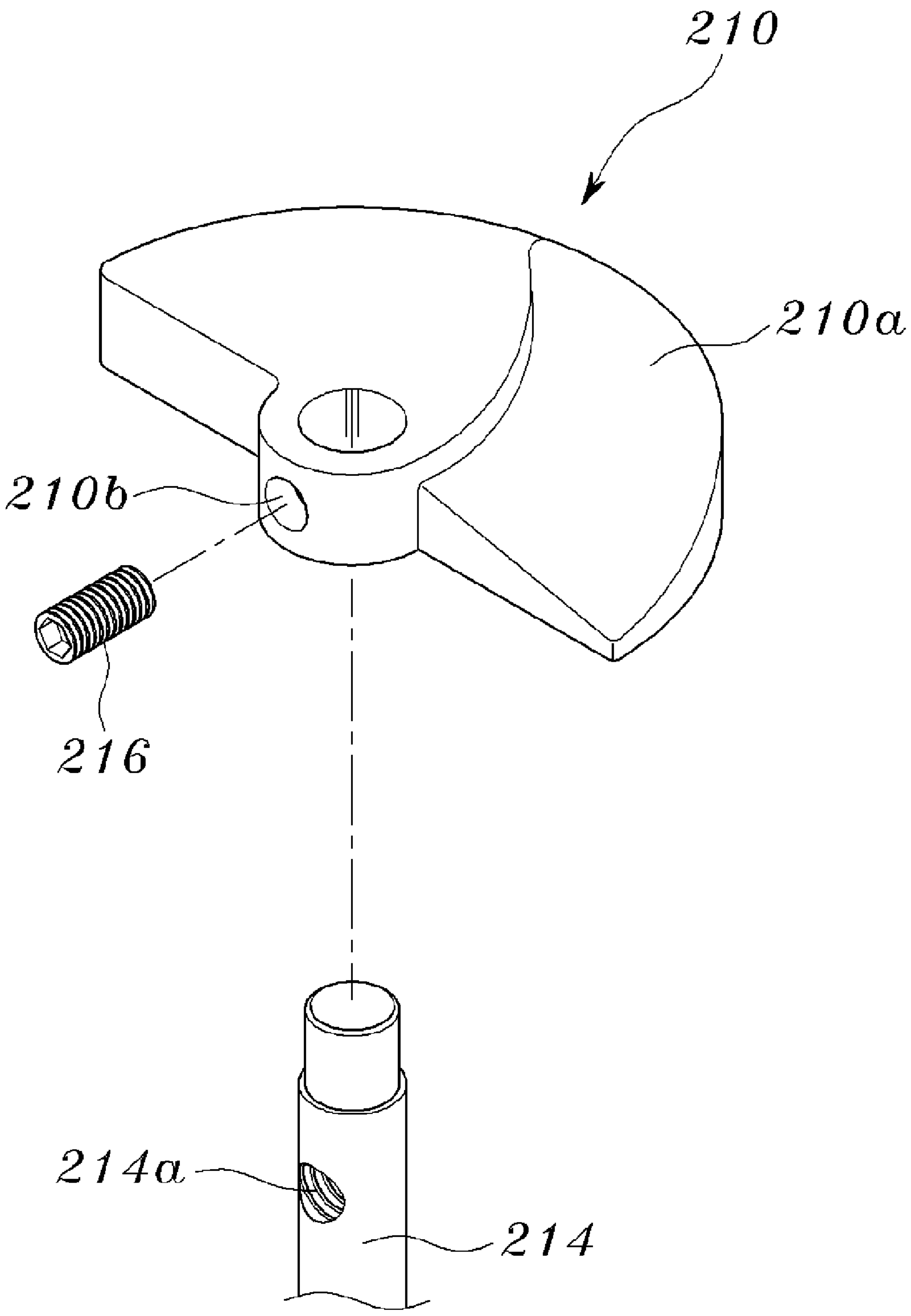
FIG. 5 is an exploded perspective view showing the coupling relationship between a rotation shaft and the eccentric weight in the vibration apparatus according to the present invention.

Meanwhile, FIG. 5 is an exploded perspective view showing the coupling relationship between the rotation shaft and the eccentric weight in the vibration apparatus according to the present invention. As shown in FIG. 5, the combination of the rotation shaft 214 and the eccentric weight 210 has a structure in that a recess 214*a* in which a screw is coupled is formed on the peripheral surface of the rotation shaft 214 and the eccentric weight 210 has a screw hole 210*b* perpendicularly communicated with the thru-hole thereof. Therefore, a hexagonal head screw 216 is screwed to the recess 214*a* through the screw hole 210*b*.

While rotating as the rotation shaft 214 rotates, the eccentric weight 210 applies eccentric force to the rotation shaft 214 so that the rotation movement of the electric motor is eccentric. As described above, the eccentric weight performs an operation of changing the center of gravity continuously. The rotation shaft 214 is shaken by the rotation movement of the eccentric weight 210.

Further, the end portion of the rotation shaft 214 is coupled to the vibration plate 212. Thus, the shake of the rotation shaft 214 is transmitted to the vibration plate 212 so that the vibration plate 212 vibrates.

The vibration plate 212, which receives the shake caused by the eccentric rotation of the eccentric weight 210 and vibrates, generates the three-dimensional spheroid wavelength.

Figure 1A:
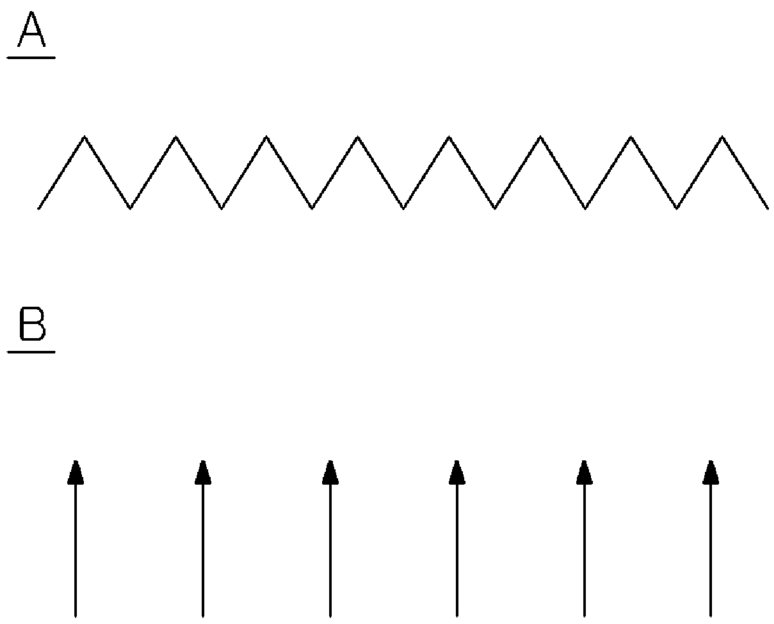
FIGS. 1A and 1B are views illustrating vibration waveform generated by a conventional vibration apparatus and vibration waveform generated by a vibration apparatus according to the present invention.
Figure 1B:
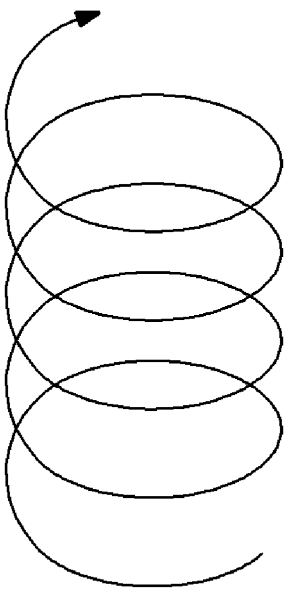

Specifically, due to the eccentric rotation of the eccentric weight 210, the vibration plate 212 performs a three-dimensional vibration movement of upward, downward, leftward and rightward, instead of two-dimensional vibration movement so as to generate the spheroid vibration wavelength (see FIG. 1B).

In FIG. 4, reference numeral 10 indicates a bed frame, reference numeral 12 denotes a bottom, and reference numeral 14 designates a mattress. The vibration apparatus according to the present invention can effectively generate a spheroid vibration wavelength (hereafter, referred to as a spheroid wavelength) using the eccentric weight 210. As shown in FIG. 4, when the vibration apparatus is applied to a bed, a spheroid wavelength field is defined on the upper surface of the mattress 14, which in turn transmits and stimulates the entire human body three-dimensionally.

Such a vibration apparatus 200 is used as a vibration source for generating one or more spheroid wavelengths depending on an instrument to which the vibration apparatus is applied. As shown in FIG. 4, the three-dimensional spheroid wavelength is formed on the upper portion of the vibration apparatus 200. Hence, a user seems to feel levitated and stimulated three-dimensionally.

The bed to which the present invention is applied as shown in FIG. 4 is merely an example. It will be understood that the vibration apparatus 200 for generating the spheroid wavelength according to the present invention may be applied to all kinds of equipments used for applying vibration to the human body resulting in the improvement of health, for example, a mat, a chair, a waist belt, a sit-down bath, a sole massager, etc.

In the meantime, when the vibration apparatus 200 is used according to the embodiment of the present invention, the stability of the rotation shaft 214 may be degraded during the rotation of the rotation shaft 214 and the eccentric weight 210 connected to the rotation shaft 214. Further, the cylindrical support member 208, connected to the bracket 206, and the vibration plate 212 may be shaken.

Figure 6:
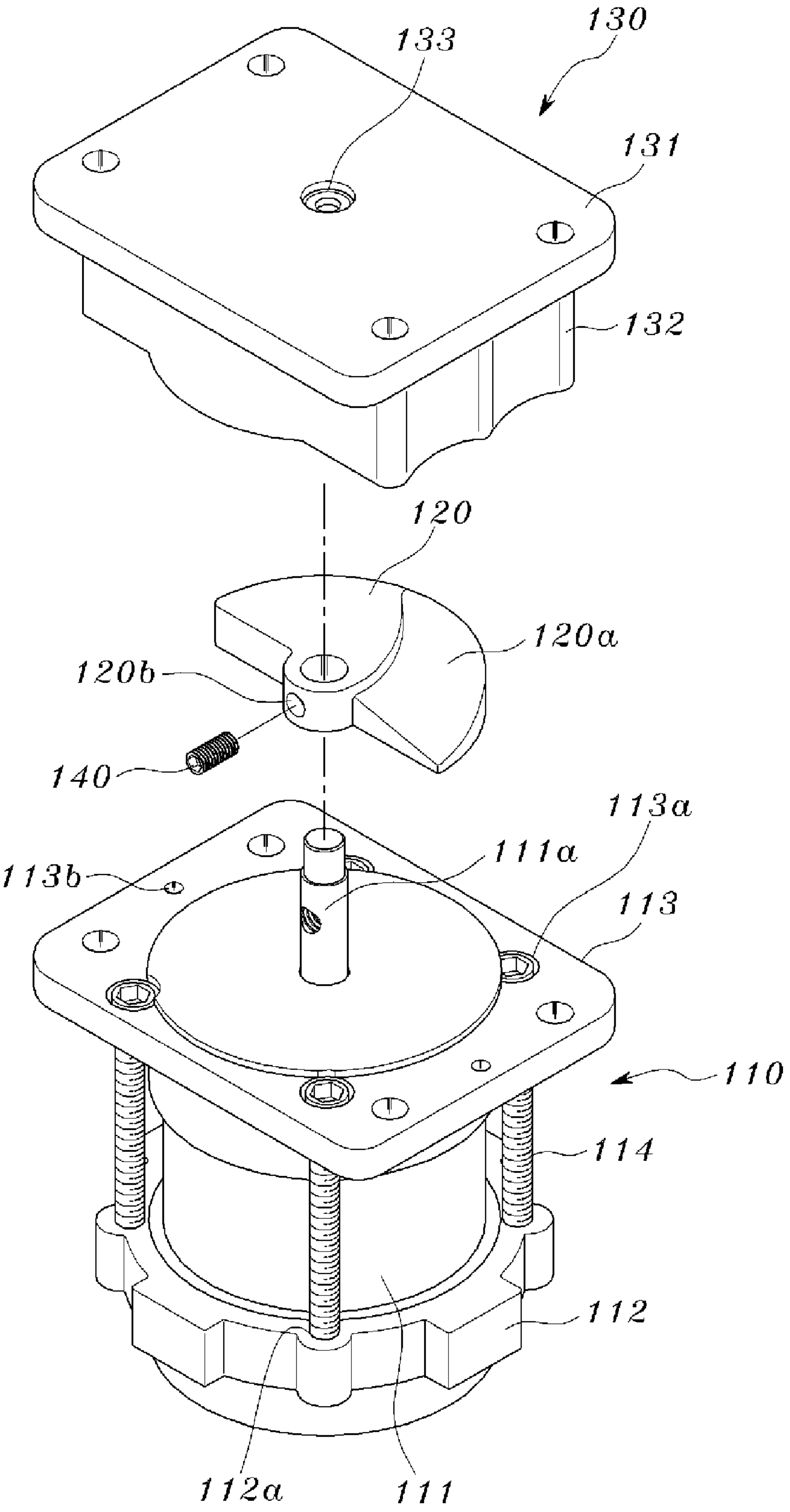
FIG. 6 is an exploded perspective view showing a vibration apparatus for generating a spheroid wavelength according to another embodiment of the present invention.
Figure 7:
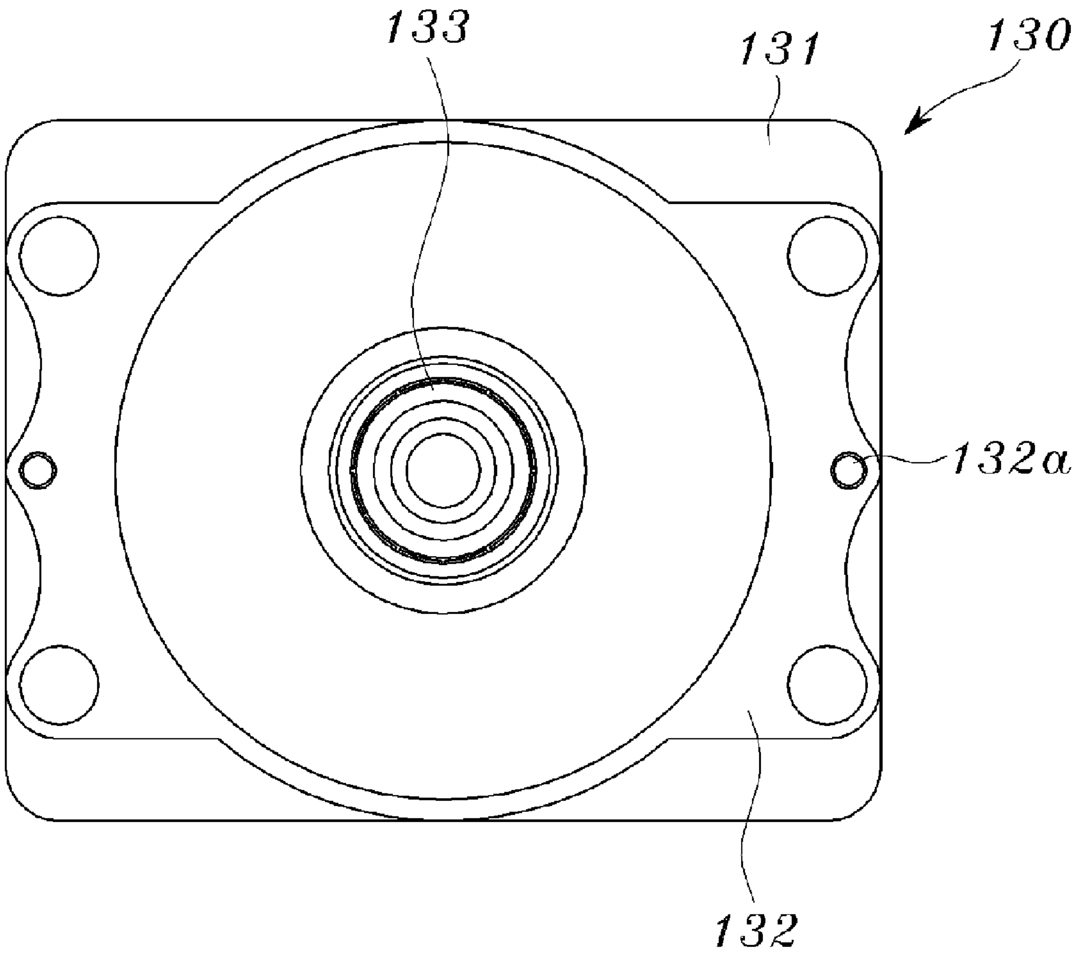
FIG. 7 is a bottom view showing a cover member in the vibration apparatus shown in FIG. 6.
Figure 8:
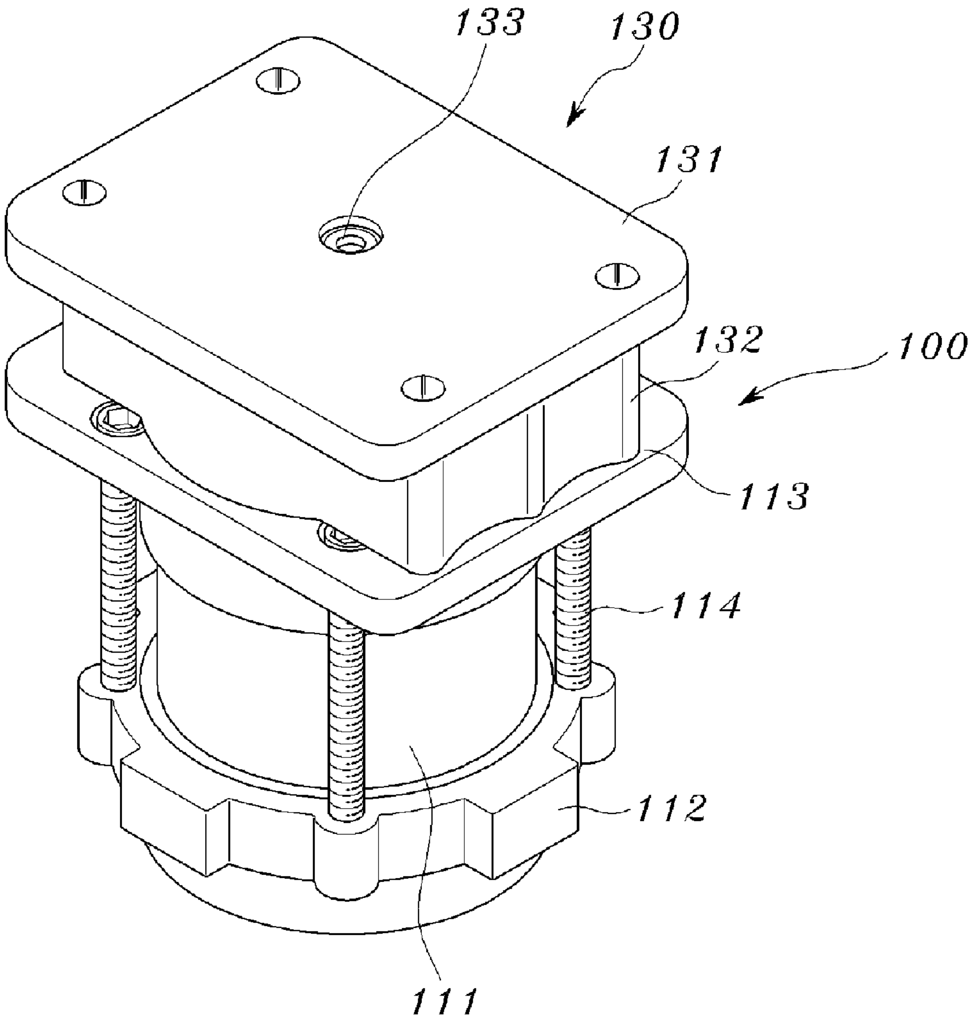
FIG. 8 is a perspective view showing the assembled vibration apparatus shown in FIG. 6.

Another embodiment of the present invention shown in FIGS. 6 to 8 has been developed in consideration of the above-mentioned defect. FIG. 6 is an exploded perspective view showing a vibration apparatus for generating a spheroid wavelength according to another embodiment of the present invention, FIG. 7 is a bottom view of a cover for the vibration apparatus shown in FIG. 6, and FIG. 8 is a perspective view showing the assembled vibration apparatus shown in FIG. 6.

Referring to FIGS. 6 and 7, the vibration apparatus for generating the spheroid wavelength according to another embodiment of the present invention includes an electric driving motor, an eccentric weight coupled to the rotation shaft of the electric driving motor, and a cover coupled to the upper portion of the eccentric weight for restraining a shaking appearance due to three-dimensional shake movement caused by the eccentric rotation of the eccentric weight.

The electric driving motor 110 is provided with a lower case 112 having a cylindrical shape with an open upper portion and an upper case 113 having an oblong shape. The lower case 112 encloses the electric motor 111, and the upper case 113 encloses the upper peripheral surface of the electric motor 111.

The upper case 113 is integrated with the coupling member 204 and the bracket 206 shown in FIG. 2. Further, the lower case 112 has a plurality of screw holes 112*a* formed at an equal interval along the edge thereof. The upper case 113 has a plurality of screw holes 113*a* formed at an equal interval along the edge thereof.

Further, the upper case 113 has thru-holes 113*b* formed at the center and both side portions. Thus, connection means, for example, hexagonal head bolts 114 are coupled to both screw holes 112*a* and 113*a*.

The eccentric weight 120 has the same shape as that of the eccentric weight 210, as shown in FIG. 5, and a thru-hole formed at the center portion thereof to couple a hinge to the rotation shaft 111*a* of the electric motor 111. Furthermore, the eccentric weight 120 has an inclined surface portion 120*a* formed from an end portion of the semi-circular surface to a portion at which the thru-hole is formed.

The cover member 130 is integrated with the cylindrical support member 208 and the vibration plate 212 which are shown in FIG. 2, in which a lower cover 132 extending from the lower surface of an upper cover 131 having a hexahedral shape. The lower cover has a cylindrical shape with an open lower portion, and has screw holes 132*a* formed at the center portion on both sides of the lower surface. Therefore, the upper case 113 and the cover 130 can be coupled by means of screws (not shown) extending through the thru-holes 113*b* of the upper case 113. Further, bearings 133 are mounted on the center portion of the upper and lower covers 131 and 132, respectively. In FIG. 6, reference numeral 120*b* indicates a screw hole, and reference numeral 140 denotes a hexagonal head screw. The combination of the rotation shaft 111*a* and the eccentric weight 120 has the same structure as that shown in FIG. 5.

Further, the generation of the spheroid wavelength according to another embodiment of the present invention shown in FIGS. 6 to 8 is identical to that of the embodiment of the present invention (FIGS. 3 and 4). Therefore, the description of the generation of the spheroid wavelength will be omitted.

In another embodiment of the present invention, the cover 130 with a desired weight is mounted on the upper portion of the eccentric weight 120 so as to restrain the shaking due to the three-dimensional movement caused by the eccentric rotation of the eccentric weight 120 and to increase the stability of the rotation shaft 111*a* according to the rotation of the eccentric weight 120.

Specifically, the lower portion of the rotation shaft 111*a* can be held by both cases 112 and 113, while the upper portion of the rotation shaft 111*a* can be held by the cover 130. As a result, it is possible to prevent the vibration apparatus from being shaken by the shaking movement of the eccentric weight 120 connected to and rotating along with the rotation shaft 111*a*.

As described above, the present invention provides a vibration apparatus which can restrain the shaking of the vibration apparatus caused by the three-dimensional movement due to the eccentric rotation of the eccentric weight, and maintain the stability of the rotation shaft so that a vibration plate generates the spheroid wavelength effectively when the eccentric weight rotates.

While a preferred embodiment of the present invention has been described for illustrative purposes, those skilled in the art will appreciate that various modifications, additions and substitutions are possible, without departing from the scope and spirit of the present invention.

What is claimed is:

1. A vibration apparatus for generating a spheroid wavelength, the vibration apparatus comprising:

an electric driving motor for generating rotation force;

an eccentric weight coupled to a rotation shaft of the electric driving motor and eccentrically rotating so that the rotation movement of the rotation shaft is converted into three-dimensional movement causing the generation of the spheroid wavelength; and a cover provided above an upper portion of the eccentric weight for restraining the shaking of the upper portion of the eccentric weight caused by the three-dimensional movement due to the eccentric rotation of the eccentric weight;

wherein the eccentric weight has a shape of a semi-circular plate, and has a thru-hole formed at the center portion of the eccentric weight in order to couple the rotation shaft;

wherein the eccentric weight has an inclined surface portion formed in a manner of cutting an upper surface of the eccentric weight from an end portion of a semi-circular surface to a portion at which the thru-hole is formed; and wherein the inclined surface is in a spiral form.

2. A vibration apparatus for generating a spheroid wavelength, the vibration apparatus comprising:

an electric driving motor for generating rotation force;

an eccentric weight coupled to a rotation shaft of the electric driving motor and eccentrically rotating so that the rotation movement of the rotation shaft is converted into three-dimensional movement causing the generation of the spheroid wavelength; and a cover provided above an upper portion of the eccentric weight for restraining the shaking of the upper portion of the eccentric weight caused by the three-dimensional movement due to the eccentric rotation of the eccentric weight;

wherein the eccentric weight has a shape of a semi-circular plate, and has a thru-hole formed at the center portion of the eccentric weight in order to couple the rotation shaft;

wherein the eccentric weight has an inclined surface portion formed in a spiral form semi-circular surface to a portion at which the thru-hole is formed;

wherein the cover includes an upper cover, a lower cover extending from the lower surface of the upper cover, and a bearing installed in and extending through the upper and lower covers; and wherein the lower cover has screw holes formed at the center portion of left and right sides of the lower cover.

* * * * *